Dec. 10, 1968 H. GUGELOT ET AL 3,415,568
VEHICLE UNDERBODY OF SANDWICH CONSTRUCTION
Filed March 17, 1966 3 Sheets-Sheet 1

INVENTORS
HANS GUGELOT, DECEASED
BY: MARIE-HELENE GUGELOT-CHUARD, HEIR AND LEGAL REPRESENTATIVE,
PETER HOPPE, ERNST REICHL, ERWIN WEINBRENNER.

ATTORNEYS

Dec. 10, 1968     H. GUGELOT ET AL     3,415,568
VEHICLE UNDERBODY OF SANDWICH CONSTRUCTION
Filed March 17, 1966     3 Sheets-Sheet 2

INVENTORS
HANS GUGELOT, DECEASED
BY: MARIE-HELENE GUGELOT-CHUARD, HEIR AND LEGAL REPRESENTATIVE,
PETER HOPPE, ERNST REICHL, ERWIN WEINBRENNER.

BY Burgess, Dinklage & Sprung

ATTORNEYS

Dec. 10, 1968   H. GUGELOT ET AL   3,415,568
VEHICLE UNDERBODY OF SANDWICH CONSTRUCTION
Filed March 17, 1966   3 Sheets-Sheet 3

INVENTORS
HANS GUGELOT, DECEASED
BY: MARIE-HELENE GUGELOT-CHUARD, HEIR AND LEGAL REPRESENTATIVE,
PETER HOPPE, ERNST REICHL, ERWIN WEINBRENNER.

BY Burgess, Dinklage & Sprung
ATTORNEYS

United States Patent Office 3,415,568
Patented Dec. 10, 1968

3,415,568
VEHICLE UNDERBODY OF SANDWICH
CONSTRUCTION
Hans Gugelot, deceased, late of Ulm, by Marie-Helene
Gugelot-Chuard, heir, Ulm, Peter Hoppe, Troisdorf,
Ernst Reichl, Oberelchingen, and Erwin Weinbrenner,
Opladen, Germany, assignors to Farbenfabriken Bayer
Aktiengesellschaft, Leverkusen, Germany, a corporation of Germany
Filed Mar. 17, 1966, Ser. No. 536,193
Claims priority, application Germany, Mar. 26, 1965,
F 45,650
11 Claims. (Cl. 296—31)

ABSTRACT OF THE DISCLOSURE

Underframe for vehicle bodies, comprising a frame, together with conventional components of the bodywork, which is designed as a single, one-piece sandwich body composed of two shells corresponding to the outer and inner contours of the vehicle bodywork, force-locked together at their edges and forming a cavity therebetween filled with a hard foam produced from an expandable reaction mixture to provide a stiff, lightweight, large surface area underframe of high stability and bearing strength sufficient to absorb all internal and external forces acting on the vehicle body.

---

This invention relates to a vehicle underbody of sandwich construction filled with a foamed plastics material.

It is known that plastics can be used in the construction of motor vehicle bodies, either as a superstructure on a conventionally built chassis or even in the form of complete load-bearing bodies incorporating the superstructure. In this regard, resins, glass-fibre-reinforced plastics based on polyesters and epoxide resins, are particularly suitable for the manufacture of body-work components. Synthetic plastics such as these are used in vehicle body construction to reduce weight and to inhibit corrosion. There is the additional advantage that tooling costs for modern designs of motor cars are much cheaper with plastics than with metals, provided production is not expected to exceed 60,000 vehicles per year.

Conventional plastics bodies are distinguished by the fact that they incorporate fewer constituent parts than a conventional body made from steel or other metal, although their structural design is still very similar to that of the corresponding metal parts and, in many instances, can only be regarded as replacement of one material by another. It is certainly of advantage to reinforce locally the plastics body by means of metal inserts pressed into it, particularly where it is subject to considerable stressing (stress points and critical alterations in cross-section). These metal inserts are fully protected against corrosion by the surrounding plastic.

Stiffness of conventional plastic bodies, produced by the same methods as metal bodies, to bending or flexure is generally less than that of steel bodies because a maximum of $\frac{1}{20}$ to $\frac{1}{10}$ of the stiffness modulus (E.J.), can be expected for the same wall thickness or section. For this reason, otherwise undesirable increases in section or wall thickness or additional reinforcements (e.g. profiled strips) are necessary. This runs contrary to the concept of lightweight construction and in addition defeats the object of an all-plastic construction.

The present invention relates to a method of producing extremely stiff lightweight plastic bodies for vehicles such as private cars, vans or omnibuses, in which there is only one sandwich-type plastic body of large surface area to absorb all the forces acting on the vehicle both from outside and from inside. The unexpectedly high bearing strength and stiffness of the sandwich-type plastic body, is due to the fact that all the cross-sections and longitudinal sections of the body are made as large as the outer contours of the body and the internal contours designed to accommodate the engine, gear-box, fuel tank and payload, will allow.

The sandwich-type body of large surface area according to the invention will, for example, in the case of the underframe of a passenger vehicle incorporate the following structural units: front section (with a high energy-absorbing capacity for head-on collisions), engine and gear-box compartments, wheel compartments, instrument frame compartment, underbody, optionally with a Cardan tunnel, fuel tank compartment, luggage compartment and tail section (with a high-energy absorbing capacity for accidents at the rear). According to the invention, all these structural units are incorporated in a single one-piece sandwich-type underframe. The suspension engine, gear-box, fuel tank, seats, instrumentation doors, wheel guards, bonnet, boot lid, windscreen frame, transverse struts and roof panel, are associated with the sandwich-type underframe according to the invention representing the main structure, in order to adsorb and transmit all the forces acting both from outside and from inside. The underframe itself, however, is able to adsorb all the forces acting on the vehicle. If required, it would be possible, in order locally to stabilise the sandwich-type underframe, or, in cases where a cover is provided to include the instrument frame compartment or the windscreen frame and the transverse struts as an additional structural unit to adsorb stresses.

Sandwich-type constructions are used as extremely light weight, but highly resistant constructions in the aircraft industry, car industry and building industry. In cases such as these, they are usually in the form of boards or single- or double-curve shells. In such an extremely lightweight construction extremely thin and very strong cover layers consisting, for example, of metal, plastics or plywood, are stabilised against premature denting or creasing by supporting them, over a large area, with very lightweight materials, to such an extent that the strength of the material may be based on the proof stress, i.e. sandwich-type thin-section metal cover layers subjected to compressive stressing, can be loaded to their yield point before they bend.

Manufacture of the sandwich-type supporting body of large surface area according to the invention, comprises initially producing two three-dimensional sandwich cover layers or shells (for example shell and lower shell) of large surface area, which are then fitted together to form a hollow assembly. For this purpose, the two shells are force-locked together around their edges, optionally in the vicinity of local stress points, if desired in the presence of adhesives, after which the core layer of the sandwich is then produced in situ in the resulting shell assembly. The three-dimensional shells may comprise metal, plastic or plywood or combinations thereof, and the cross-sections of the shells may be so varied as to correspond to the stress distribution in the sandwich-type underframe. For example, the cross section of the shell in the front and rear sections of the underframe, is reduced to an acceptable minimum for normal use in order, in the event of accidents either at the front or rear, that any creasing and folding of the shell of the sandwich will occur at or near the point of impact. Similarly, local increases in section or wall thickness are necessary to provide satisfactory dimensions at the site of critical transitions in cross-section.

In addition, local increases in section will be provided in cases where individual stresses emanating, for example, from the suspension, shock absorbers or seats, have to be absorbed. In this dynamically highly stressed sandwich-type underframe, any increases in section should be gradual in order to avoid intense stress peaks.

A fibre-reinforced, for example glass-fibre reinforced synthetic material based, for example, on unsaturated polyester resins, epoxide resins or polyurethanes, is suitable for use as the shell material for the underframe according to the invention. The advantages of shell materials such as these are that they can be readily moulded by the hand lay-up process and by the injection process. In view both of the three-dimensional and hence somewhat complicated structure of the shells, and of the high specific strength of the sandwich-type underframe required for an extremely lightweight construction, it is advisable to use the autoclave-moulding process in order to be able to produce absolutely uniform shells, for example with a glass-fibre content of up to 62% or 63% and more, and hence an optimum modulus of elasticity of, for example $\geq 250$ kg./cm.$^2$, under an absolutely uniform moulding pressure.

It is also possible in the case of shells comprising glass-fibre-reinforced plastic, to insert additional metal plugs near local stress points, so that the entire outer shell of the sandwich construction will be fully protected against corrosion.

The sandwich core layer of the underframe is produced by filling the hollow shell assembly. The process used is known as the "core" or "filling" process in which liquid expandable plastics reaction mixtures are used. Examples of reaction mixtures which may be used for this purpose are those based on phenol-formaldehyde resins, epoxide resins and polyurethanes which, if desired, may be subjected to the high-frequency process in order to shorten the crosslinking stage.

The sandwich core layer may also be produced from a polystyrene-based foam, in which case the shell assembly is filled with pre-expanded beads of the raw material which are then welded together to form the uniform foam layer by the steam-jet process or by the high-frequency process.

The sandwich "core" or "filling" process in which liquid expandable plastics reaction mixtures based, for example on polyurethane, are used offers considerable advantages, particularly for the production of a dynamically highly stressed underframe because the sandwich core layer may be developed or formed so as to have a non-uniform density (unit weight), i.e. the foam supporting core may decrease in density towards the centre of the core. For example, the density of the sandwich supporting core may be between 0.3 and 0.5 g./cm.$^3$ (5 to 15 mm. thick) directly beneath the shell and may decrease to 0.06 to 0.08 g./cm.$^3$ towards the centre of the core. The modulus of elasticity of supporting cores such as these, is about 5 to 10 times higher than that of a uniform supporting core, which is of considerable importance for increasing the crease resistance of the shell. In addition, the bearing strength of statically and dynamically highly stressed sandwich bodies is dependent upon the production of a satisfactory bond between the core layer and the shell, in order to ensure that the supporting layer performs its proper function throughout the assembly as a whole.

The variation in density and fixing or anchoring of the supporting core is obtained by first of all mechanically roughening the inside surfaces of the shells comprising, for example, of glass-fibre-reinforced plastics, for example, by sand-blasting them, and by subsequently coating them with an adhesive in which three-dimensional glass-fibre or synthetic-fibre fleeces or flocked carrier materials (for example jute) are embedded, or on to which fibres are directly flocked electrostatically.

The three-dimensional fleeces may have a weight per square metre of 50 to 100 g., depending upon the static requirements in order to provide a strengthened or reinforced supporting core boundary zone some 1 to 15 mm. thick during the foaming in situ of the core. Accordingly, fibres of different lengths (for example 3 to 15 mm.) and diameter (0.1 to 1.5 mm.) may be used for flocking. In addition, the quantity of flocked fibres may vary locally per square metre. The required increase in density of the supporting core directly beneath the shell is automatically obtained in the area occupied by the aforementioned fleeces whilst the hollow shell assembly is filled with foam. The shell assembly thus formed can be filled with foam-forming materials which foam in situ to produce the sandwich-type supporting frame according to the invention in one operation, in which case the formulation for the supporting core to be produced (unit weight 50 to 150 kg./cm.$^3$) has to be so chosen (for example in the case of hard polyurethane foams) that the expanding reaction mixture fills all the cavities formed by the assembled shells before it loses its fluency and before crosslinking begins.

According to the invention, the required degree of fluency of the foam reaction mixture which has to fill the entire hollow space (1,000 litres capacity, for example) is obtained by feeding the mixture as quickly as possible, for example to four points of the hollow assembly. For this purpose, the mixture, which is preferably delivered through a mixing head, is guided from the centre of gravity of the component, for example through a distributor tube system of, for example, metal or glass-fibre-reinforced plastic based on polyvinyl chloride, which is pre-mounted on one of the shells and is left behind in the sandwich body, to the selected points of entry, two of which are located in the underbody, a third in the front section cavity and a fourth in the bottom of the luggage compartment. The quantities in which the mixture is locally distributed must correspond to the volume of the associated cavity. This is done by suitable choice of the internal diameter of the distributor tubes. According to the invention, the quantity of mixture to be delivered into the front section cavity is passed through two equally large distributor tubes each of which comprises vertical right-hand and left-hand branches near the door panels. According to the invention, these vertical distributor tubes, which, as mentioned above, are fixed to one of the shells and are surrounded by foam, are included in the sandwich construction to absorb the stress affecting the door panels. Accordingly, it is possible in accordance with the invention to include the distributor tube running towards the tail section in order additionally to stabilize the petrol tank opening or recess in the sandwich-type underframe.

Since foaming in situ may be carried out in one operation, the distribution of unit weight may be uniform throughout the entire foam supporting core. It is possible, however, locally to adapt the density of the sandwich supporting core to stresses in the cover layer affecting certain sections of the underframe, by deliberately limiting the intervals between the cover shells and, if desired, by additionally increasing the quantity per square metre of fibre used to strengthen the boundary zones.

In addition, it is also possible to divide the hollow body formed by the assembled shells, into individual compartment by means of foam strips, and optionally to provide each of these compartments with supporting cores of different density.

Any stresses emanating, for example, from telescopic legs or struts or from shock absorbers, have to be guided perpendicularly or at a slight angle into the underframe according to the invention so that, in these areas, the sandwich supporting core is additionally subjected to high compressive, tensile and shear stresses.

It has been found that the supporting core can be completely stabilised locally by means of tensile, compressive and shear reinforcements which can be thoroughly surrounded by foam, in order to avoid core breaks and cracks in the joint between the shell and core caused mainly by dynamic stressing. This can be done, for example, by introducing into the critical zones of the frame, before the shells are fitted together to form the hollow shell assembly, fibre arrangements, torsion bristles, honeycombs, sleeves, gauzes or other systems, which should cut to size in such a way that, when the shells are fitted together to form the hollow body, they project into, or are pressed into, the material arranged on the inside of the shells to reinforce the boundary zones of the supporting core to be produced, and are thus firmly anchored in it or felted with it. By virtue of the fact that this core reinforcement is completely surrounded by foam during the foaming in situ of the hollow body as a whole, there is a considerably local increase in unit weight and a marked increase in the strength of the interior of the core so that the local individual forces acting perpendicularly of the sandwich construction are satisfactorily propagated into both the shells of the sandwich construction.

In order to aid economic production of the sandwich-type underframe, it is advantageous to pre-assemble additional functional components before the shells are assembled to form the hollow body, and to have them already present during the foaming operation. For example, cables of all kinds and sizes, pipes for accommodating electrical conductors, feed pipes for oils and fuels, fuel tanks or special instruments, may be pre-assembled and surrounded by foam, thus considerably increasing the reliability of the body in use.

After the hollow shell assembly has been filled with foam, the two vertically adjacent shells are additionally provided, according to the invention, with a mechanical connection in the form of rivets, screws or spot welds (where metal shells are used) near the edges of the underframe and near local stress points, in order to ensure satisfactory stress propagation in the shells in the event of flexural, torsional and combined stressing of the sandwich underframe. If required, additional local pre-formed fittings may be subsequently applied to the outside of the underframe by bonding, screwing, riveting or by a combination of these joining means.

In the case of passenger vehicles, for example, the design of the underframe according to the invention leads to further extremely important practical results in respect of the general design of the body.

In principle, the underframe may be regarded as a "ready-to-move" unit, following installation of the engine gear-box, suspension, front seats, instrumentation and, if not formed in situ, the fuel tank. Any other attachments or fittings which contribute towards the safety of the vehicle and towards its aerodynamically favourable design, can be purposely designed in such a way that they are easy to remove for repairs and that for example, the vehicle can be made as a convertible and as a saloon, i.e. sedan. Fittings such as the front windscreen (a sheet of Plexiglas), transverse struts, rear window (Plexiglas), instrument panel box, are subsequently mounted on the sandwich-type underframe, preferably by screw connections, and, in the event of a serious accident, strengthen the sandwich underframe which is so designed as to be strong enough to withstand normal accidents.

The doors which do not have any function to perform, as far as the bearing strength of the underframe is concerned, are generally of sandwich-type construction, in order again to provide a high degree of stiffness.

The underneath of the sandwich-type underframe will already have been provided with an aerodynamically favourable design. If desired, it is possible in order further to increase the torsional resistance of the centre part of the underframe (underbody) to close the Cardan tunnel which is still open on the underside by screwing on a corrugated and hence crease-resistant plate of glass-fibre-reinforced plastics material, or a plastic-coated sheet of metal.

In order to obtain an aerodynamically favourable external form, the upper part of the underframe with its headlight recesses, engine-, passenger- and luggage compartments, can be equipped with an assembly of several component parts such as wheel guards, bonnet, boot lid and roof panel, which need only consist of, for example, a glass-fibre-reinforced plastics material. Vehicles with underbodies according to the invention can have the front and rear assemblies designed so as to improve the aerodynamics of the body and protect the front and rear sections of the underframe in the event of accidents. For this purpose, these fittings can be designed, as "enveloping shells" for example, at a distance of 30 to 50 mm. which, in the event of a serious accident, exhibit a high energy-absorbing capacity by virtue of the room for deformation, and prevent the underframe itself from being directly stressed. In addition, those parts of the front and rear sections belonging to the underneath of the underframe, can be further protected against serious accidents by replaceable shock absorbers, for example, elastic foam mouldings with tight elastic cover layers on their surfaces.

To protect it against water and stones, the underneath of the underframe is advantageously coated with an elastic material, preferably based on sprayable polyurethane elastomer, so as to maintain permanently the statically and dynamically necessary structural strength of the lower cover layer of glass-fibre-reinforced plastic.

The sandwich-type underframe according to the invention, is applicable not only to road vehicles, but also to railway vehicles, watercraft and aircraft.

Embodiments of an underframe intended for a motor vehicle are diagrammatically illustrated in the accompanying drawings.

Figure 1:
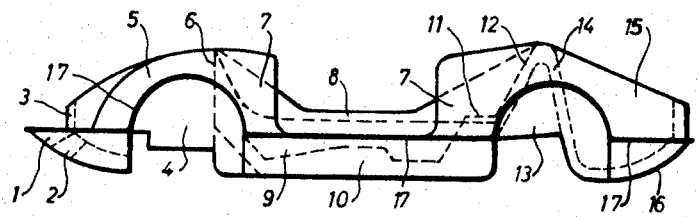
FIG. 1 is a longitudinal side view of a vehicle body underframe in accordance with the invention.
Figure 2:
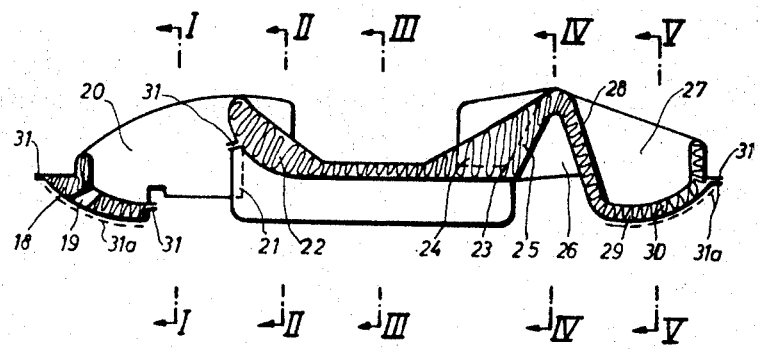
FIG. 2 is a schematic sectional view of the underframe of FIG. 1.
Figure 3:
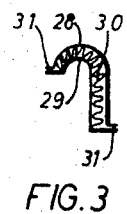
Figures 4, 5:
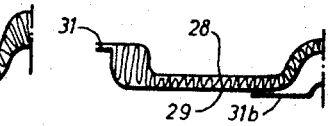
Figure 6:
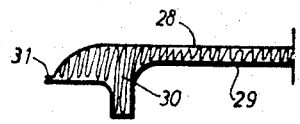
Figure 7:
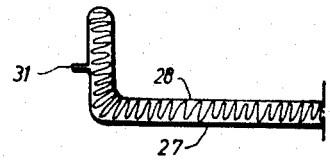
Figure 8:
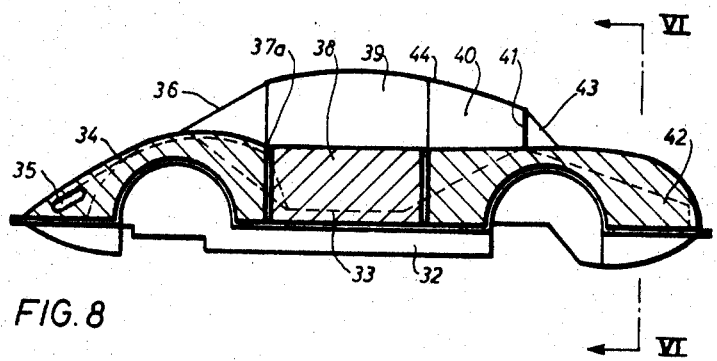
Figure 9:
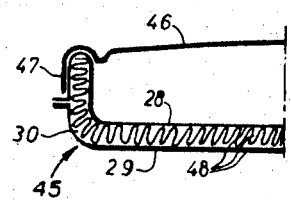
Figures 10, 11:
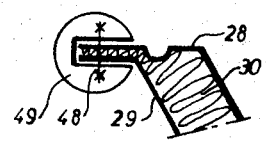
Figure 12:
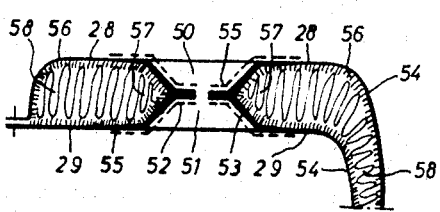
Figure 13:
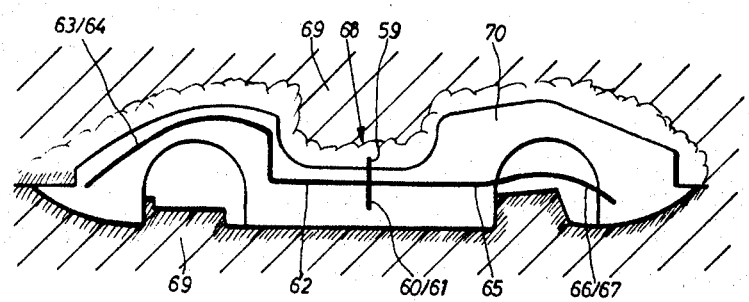
Figure 14:
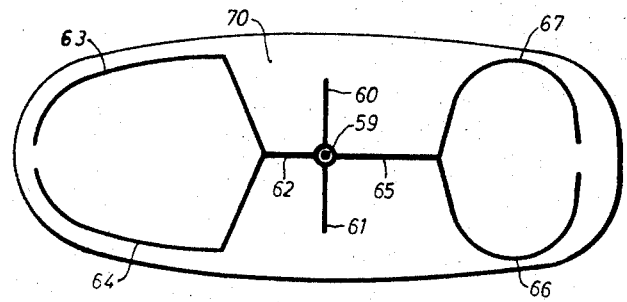

FIGS. 3 through 7, respectively, are partial cross-sectional views taken along the lines I—I, II—II, III—III, IV—IV and V—V of FIG. 2;

FIG. 8 is a further schematic longitudinal view of the underframe of FIG. 1 illustrating further components provided thereon in regard to the usual passenger car components;

FIG. 9 is a partial cross-sectional view taken along the line VI—VI of FIG. 8;

FIGS. 10 and 11 show further partial cross-sectional views of modified supportable connections between the shells of the underframe sandwich assembly;

FIG. 12 is a schematic partial cross-sectional view of another modification of a shock absorber connection in accordance with the invention; and FIGS. 13 and 14 are schematic longitudinal and plan views of the underframe construction in accordance with the invention provided with filler tubes to achieve the introduction of the foam material used to form the sandwich with the two shells.

FIG. 1 is a side view of a sandwich-type underframe designed, for example, for a passenger car. As a one-piece major structural unit, it incorporates the following component units: a front section 1 with an air vent 2 and front plate 3 for an engine compartment, side walls 4 of the engine compartment incorporating front wheel guards 5, a rear wall 6 for the engine compartment, front side wall sections 7 for a passenger compartment, a central Cardan tunnel supports 8, a lateral boundary section 9 for the passenger compartment, underbody reinforcements 10, a rear seat section 11, a rear wall 12 for a back seat, side walls 13 for the fuel tank compartment, rear wheel guards 14, a boot compartment 15 and a rear or tail section 16. The thick line 17 represents the outer contact surface between the two prefabricated shells which are joined together along this contact surface to form the hollow shell assembly to be filled with foam.

FIG. 2 is a longitudinal section through the sandwich system of the underframe. The front section 18 with its air vent 19 is connected to the central Cardan tunnel support 22 through the side wall 20 and the rear wall 21 of the engine compartment. Between the rear seats 23, the Cardan tunnel support is elevated in the form of a web 24 relative to the rear wall 25. Behind the fuel tank compartment 26 is the boot compartment 27. 28 is the upper shell and 29 is the lower shell of the sandwich system, whilst the wavy line represents the sandwich core 30. In the central longitudinal section as illustrated, the points at which the shells are joined are denoted by the reference 31. 31a is the spray applied as underbody protection. It may, for example, be based on polyurethane elastomers. The various views in FIG. 3 to 7 show the half-sandwich cross-sections along the lines I—I, II—II, III—III, IV—IV and V—V, respectively whose positions are shown in FIG. 2. Along these lines, the underframe structure is symmetrical about a longitudinal plane. In this case, too, the shells are denoted by the references 28 and 29, the sandwich core by the reference 30 and the points at which the shells are joined by the reference 31. In the section III—III (FIG. 5), 31b represents an optional, additional bolt or screw attachment for a corrugated cover plate intended to shield the Cardan tunnel. The principle of the sandwich-type underframe provided with fittings is shown in FIG. 8. The underframe, the lower section of which is shown in full lines 32 and the upper section in broken line 33, is completed by the following units: a three-part front shell 34 comprising the engine cover and the wheel guards with their headlight recesses 35, the front windscreen frame 36 incorporating a pivoting window (not shown), the instrument panel box 37a, the doors 38 of sandwich type construction incorporating lever-operated windows 39, adjustable rear sidescreens 40, the transverse section 41, the three-part rear shell 42 consisting of the lid to the boot compartment and rear wheel guards, the rear window 43 and the readily removable roof panel 44.

The half cross-section VI—VI (see FIG. 8) through the boot compartment of the complete vehicle is shown in FIG. 9. The underframe 45 having upper and lower shells 28 and 29 and a supporting core 30, is covered by a three-part rear shell made up of a lid 46 for the boot compartment and a wheel guard 47.

FIGS. 10 and 11 are cross-sections through different types of connections between the upper and lower shells 28 and 29 such as are necessary to form the hollow shell assembly which will subsequently be filled with the supporting core 30.

Screws can be passed through the complete sandwich body for example, at 48 near the connection between the shells 28 and 29 and if desired may be protected, preferably with an elastic rubber or plastic profiled strip 49 which at the same time, may be so designed as to be large enough to act as a shock absorber, for example, for the front and rear sections.

FIG. 12 is a cross-section through such a shock absorber connection in the upper part of a wheel compartment of the sandwich-type underframe. In this zone, the upper and lower shells 28 and 29 have indentations 50 and 51 so that they contact each other at 52. Once again, bolts or screws can be passed through the contact surfaces of the shells at this point, after the sandwich supporting core has been produced. As is also shown in FIG. 12, the thickness of the shell at this point, 53, may be increased relative to the normal shell thickness 54. It is also possible subsequently to apply prefabricated dish-shaped reinforcements 55, for example, by screwing or riveting and bonding, in order to provide further local stabilisation for the shells.

FIG. 12 also illustrates the necessary boundary zone reinforcement 56 of the supporting core and the additional local core reinforcement 57, for example, by honeycombs or plaited fabrics, which produce local increases in specific strength exceeding that of the unreinforced foam 58.

FIGS. 13 and 14 (FIG. 14 is a plan view of the subject of FIG. 13) illustrate the arrangement of filling tubes 59–67 premounted in the hollow body for the introduction of the reaction mixture 68 into the hollow shell assembly 70 arranged in a supporting apparatus 69.

In some instances, the shells need only be as thick as films or foils, provided the specific elasticity modulus and shear modulus of the foam core layer, both of which are governed by the aforementioned boundary zone reinforcement by fibres of all kinds, are so high that the core layer not only acts as a support for the shells, but itself provides a high percentage of the stiffness of the sandwich body both in flexure and in torsion.

We claim:

1. Wheeled vehicle body underframe which comprises a single, self-supporting and complete load-bearing unitary sandwich body and chassis adapted to be suspended on wheels including two slightly spaced apart structural shell members conforming to the outer and inner contours correspondingly of the vehicle bodywork which are force-locked together at edge portions thereof and which define therebetween a cavity, and a hard plastic foam core produced from an expandable reaction mixture and filling substantially completely said cavity and reinforcedly contacting the adjacent surfaces of said shell members, and seating means defined contiguously with said unitary body and chassis for accommodating wheel suspension means for such vehicle, whereby to form a stiff lightweight large surface area self-supporting and complete load-bearing unitary vehicle body and chassis underframe of high stability and bearing strength adapted to absorb all internal and external forces acting on the vehicle body.

2. Underframe according to claim 1 wherein said shell members are provided with a lining of fibrous filler-containing adhesive material on their surfaces facing said cavity.

3. Underframe according to claim 1 wherein prefabricated compartments are arranged within said cavity.

4. Underframe according to claim 1 wherein distributor tubes for feeding the expandable reaction mixture are arranged within said cavity in the form of flow connecting elements for appropriate expandable reaction mixture feed fittings arranged externally to the underframe, said distributor tubes ultimately being embedded in the foam core provided and thereby increasing the structural reinforcement of the sandwich body.

5. Underframe according to claim 1 wherein reinforcement fibers are appropriately disposed in said cavity to reinforce locally said foam core.

6. Underframe according to claim 1 wherein conduit tubes are embedded in said foam core for accommodating electric conductors, accessory cables, fuel flow, and the like, thereby increasing the structural reinforcement of the sandwich body.

7. Underframe according to claim 1 wherein the wall thickness of said shell members is reduced in appropriate local portions to the structurally thinnest possible sectional dimension.

8. Underframe according to claim 1 wherein said sandwich body is provided on the underside surface thereof with an elastic protective covering.

9. Underframe according to claim 1 wherein said sandwich body is shaped to define thereby appropriately contoured portions representing vehicle body components including at least one of front section, engine compartment, gear-box compartment, wheel compartments, instrument compartment, Cardan tunnel, fuel tank compartment, luggage compartment and rear section.

10. Underframe according to claim 1 wherein said shell members are constructed of a material selected from the group consisting of metal, plastic and wood, and said foam core is formed from an expandable reaction mixture containing polyurethane groups.

11. Underframe according to claim 1 wherein said shell members are constructed of a glass-fiber-reinforced plastics material having a glass content of up to about 63%.

References Cited

UNITED STATES PATENTS

| | | |
|---|---|---|
| 2,653,139 | 9/1953 | Sterling. |
| 2,728,702 | 12/1955 | Simon et al. |
| 2,950,701 | 8/1960 | De Stefani _____ 9—6 X |
| 3,013,922 | 12/1960 | Fisher _____ 9—6 X |
| 3,080,267 | 3/1963 | Schmalz. |
| 3,163,434 | 12/1964 | Krueger. |
| 3,331,627 | 7/1967 | Schröder et al. |

FOREIGN PATENTS 1,202,866   7/1959   France.

LEO FRIAGLIA, *Primary Examiner.*